(12) United States Patent
Badar et al.

(10) Patent No.: US 11,510,034 B2
(45) Date of Patent: *Nov. 22, 2022

(54) TRIGGER MANAGEMENT FOR ROAMING CALLS IN IMS NETWORKS

(71) Applicant: T-Mobile USA, Inc., Bellevue, WA (US)

(72) Inventors: Saqib Badar, Bellevue, WA (US); Nassereddine Sabeur, Seattle, WA (US); Jyot Kumar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,988

(22) Filed: Nov. 23, 2020

(65) Prior Publication Data

US 2021/0152988 A1 May 20, 2021

Related U.S. Application Data

(63) Continuation of application No. 16/688,089, filed on Nov. 19, 2019, now Pat. No. 10,848,933.

(51) Int. Cl.
*H04W 8/12* (2009.01)
*H04W 4/24* (2018.01)
(Continued)

(52) U.S. Cl.
CPC ............ *H04W 4/24* (2013.01); *G06Q 40/12* (2013.12); *H04L 65/1016* (2013.01);
(Continued)

(58) Field of Classification Search
CPC .................. H04W 8/12; H04W 4/24
See application file for complete search history.

(56) References Cited

U.S. PATENT DOCUMENTS

10,848,933 B1* 11/2020 Badar .............. H04W 4/24
2006/0252425 A1* 11/2006 Jiang ............... H04W 8/20
455/432.1

(Continued)

OTHER PUBLICATIONS

Office Action for U.S. Appl. No. 16/688,089, dated Apr. 13, 2020, Badar, "Trigger Management for Roaming Calls in IMS Networks", 11 Pages.

*Primary Examiner* — Barry W Taylor
(74) *Attorney, Agent, or Firm* — Lee & Hayes, P.C.

(57) ABSTRACT

An IP Multimedia Subsystem Service Control Point (IMS-SCP) module of a carrier network may provide trigger management for a request for a circuit switched (CS) call. For example, an IMS-SCP module may receive an request for a CS call associated with a user equipment. The IMS-SCP module may determine handling of the request for the CS call includes one or more first operations by a first feature platform and one or more second operations by a second feature platform. In response to the determining, the IMS-SCP module may perform trigger management associated with the request for the CS call. The trigger management may include invoking, by the IMS-SCP module, the one or more first operations of the first feature platform and, subsequent to the invoking the one or more first operations, invoking the one or more second operations of the second feature platform.

20 Claims, 4 Drawing Sheets

(51) Int. Cl.
*H04W 4/16* (2009.01)
*H04W 8/26* (2009.01)
*H04L 65/1016* (2022.01)
*H04M 3/42* (2006.01)
*G06Q 40/00* (2012.01)
*H04L 65/1063* (2022.01)

(52) U.S. Cl.
CPC .... *H04L 65/1063* (2013.01); *H04M 3/42195* (2013.01); *H04W 4/16* (2013.01); *H04W 8/26* (2013.01); *H04M 2207/18* (2013.01); *H04M 2215/7442* (2013.01)

(56) References Cited

U.S. PATENT DOCUMENTS

| | | | | |
|---|---|---|---|---|
| 2008/0205381 | A1* | 8/2008 | Zhu | H04M 15/854 370/352 |
| 2011/0045828 | A1* | 2/2011 | Madan | H04Q 3/0045 455/433 |
| 2011/0249658 | A1* | 10/2011 | Wohlert | H04L 67/24 370/338 |
| 2015/0011181 | A1* | 1/2015 | Livne | H04L 12/1467 455/406 |

* cited by examiner

TRIGGER MANAGEMENT FOR ROAMING CALLS IN IMS NETWORKS

CROSS REFERENCE TO RELATED APPLICATIONS

This application is a continuation of and claims priority to U.S. patent application Ser. No. 16/688,089, filed on Nov. 19, 2019, which is fully incorporated herein by reference.

BACKGROUND

Modern cellular communication networks often include IP Multimedia Subsystems (IMSs) for delivering IP multimedia services. In many situations, however, users who are attempting to communicate with each other may be supported by different communication providers, so that multimedia calls and communications need to be set up between IMS systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods that provide trigger management between feature platforms, and particularly in the processing of roaming calls by an IP Multimedia Subsystem (IMS). Trigger management may refer to the successive invocation of a set of feature platforms in a sequence for a same session. In certain described embodiments, the devices, systems, and methods disclosed herein relate to providing trigger management for the invocation of feature platforms for normalization and charging of an inbound roaming call by an IMS of a home carrier network.

For example, certain described embodiments may handle trigger management between a Value Added Services (VAS) platform (e.g. Roamware) and a charging platform(s) (e.g. a Charging Service Control Point (cSCP) platform and/or a Online Charging Server (OCS) platform) in response to an inbound call request associated with a session for which the originating carrier network is not home carrier network (i.e. a session originating in a roaming carrier network).

While normalization and charging platforms and the operations thereof are utilized in the discussions of example embodiments throughout this disclosure, this disclosure and the appended claims are not so limited.

In some embodiments, an IP Multimedia Subsystem (IMS) may include a module or application, labeled herein IMS-SCP or IMS-SCP module, that may receive a Customized Applications for Mobile Networks Enhanced Logic (CAMEL) trigger (e.g. a CAMEL Initial Detection Point (CAP IDP) Message) from the foreign Mobile Switching Centre (MSC) where the session is originating. The IMS-SCP may act as an integrated IMS service control point (SCP) and may perform trigger management for such inbound roaming call requests. More particularly, the IMS-SCP may receive a CAMEL IDP from the visited MSC and perform trigger management between the VAS platform and charging platforms (Examiner g cSCP and/or OCS) if applicable based on the configuration/user profile. In some examples, the IMS-SCP may be separate from a Telephony Application Server (TAS) of the home network. For example, the IMS-SCP may be a separate IMS-SCP server that may handle CAP IDPs from a foreign MSC and perform orchestration based on the configuration/service profile.

In some embodiments, the IMS-SCP may interact with each feature platform over a respective, and in some cases, native interface. For example, the IMS-SCP may interact with an VAS platform over a Representational State Transfer (REST) interface. Similarly, the IMS-SCP may communicate with various charging platforms over associated interfaces (e.g. over a CAMEL interface for a cSCP platform or over a diameter (Ro) interface for an OCS platform).

As discussed above, the IMS-SCP may invoke feature platforms in a sequence and manage sessions therewith as each platform performs operations for a request. In some examples, the feature platforms may perform the invoked operations purely in sequence with a feature platform being invoked once the prior feature platform has completed operations while, in other examples, the feature platforms may operate at least partially in parallel. In examples in which the feature platforms operate in parallel, the trigger management functionality of the IMS-SCP may include performing updates between the various feature platforms when operations of a particular platform change, update or otherwise cause a change to information upon which another platform was invoked. For example, when a normalization platform and a charging platform are operating in parallel, the normalization of the called number by the normalization platform may modify or otherwise change the number the charging platform is basing charging operations upon. As such, the IMS-SCP may provide the normalized called number to the charging platform. Depending on the embodiment, the update of the called number may or may not necessitate a restarting of the operations of the charging platform.

In some examples, the sequence of the invocation between the platforms may be customizable and controlled by the operator (e.g. the operator may choose whether normalization or charging is invoked first) and the sequence may be situational.

In an example scenario directed to normalization and charging for an inbound roaming call, a user roaming internationally may dial an international number without using a country code. Such a call may normally result in an error for an invalid number. However, the normalization (e.g. VAS) platform may provide functionality to detect a roaming location of the user and to add the correct country code to the called number to provide a routable phone number to the vMSC and charging platform. One of ordinary skill in the art would understand that normalization is not limited to this particular example normalization scenario and that many other normalizations may also be identified and invoked by the VAS depending on the situation.

Further, if a number is the one that requires real time charging, the IMS-SCP can perform trigger management between the VAS and cSCP/OCS to give appropriate charging of such calls. As such, the user may receive the service desired and also be charged correctly. One of ordinary skill in the art would understand that charging operations are not limited to this particular example real time charging scenario and that many other charging operations may also be identified and invoked by the charging platform depending on the situation.

As mentioned above, the IMS-SCP may handle updates between the feature platforms and the originating MSC. For example, if the called number gets normalized by the VAS platform, the IMS-SCP may communicate the updated number to the charging platform (e.g. the cSCP or OCS) for correct charging of the call. Further, if the number is changed by the normalization platform, the IMS-SCP may communicate the normalized number to the vMSC so that the vMSC may connect the call to the updated number.

As part of trigger management, in some examples, the IMS-SCP may maintain individual protocol and application level timers for each feature platform triggered for feature handling. In addition, the IMS-SCP may include an error detection framework for each platform triggered by the IMS-SCP and the IMS-SCP may be configured to control whether to continue or release the session for particular error cases. In addition or alternatively, IMS-SCP may maintain the error handling framework and the orchestration logic of the IMS-SCP may notify feature platforms of errors in other feature platforms involved in the session such that each feature platform may be aware of the status of the session.

Figure 1:
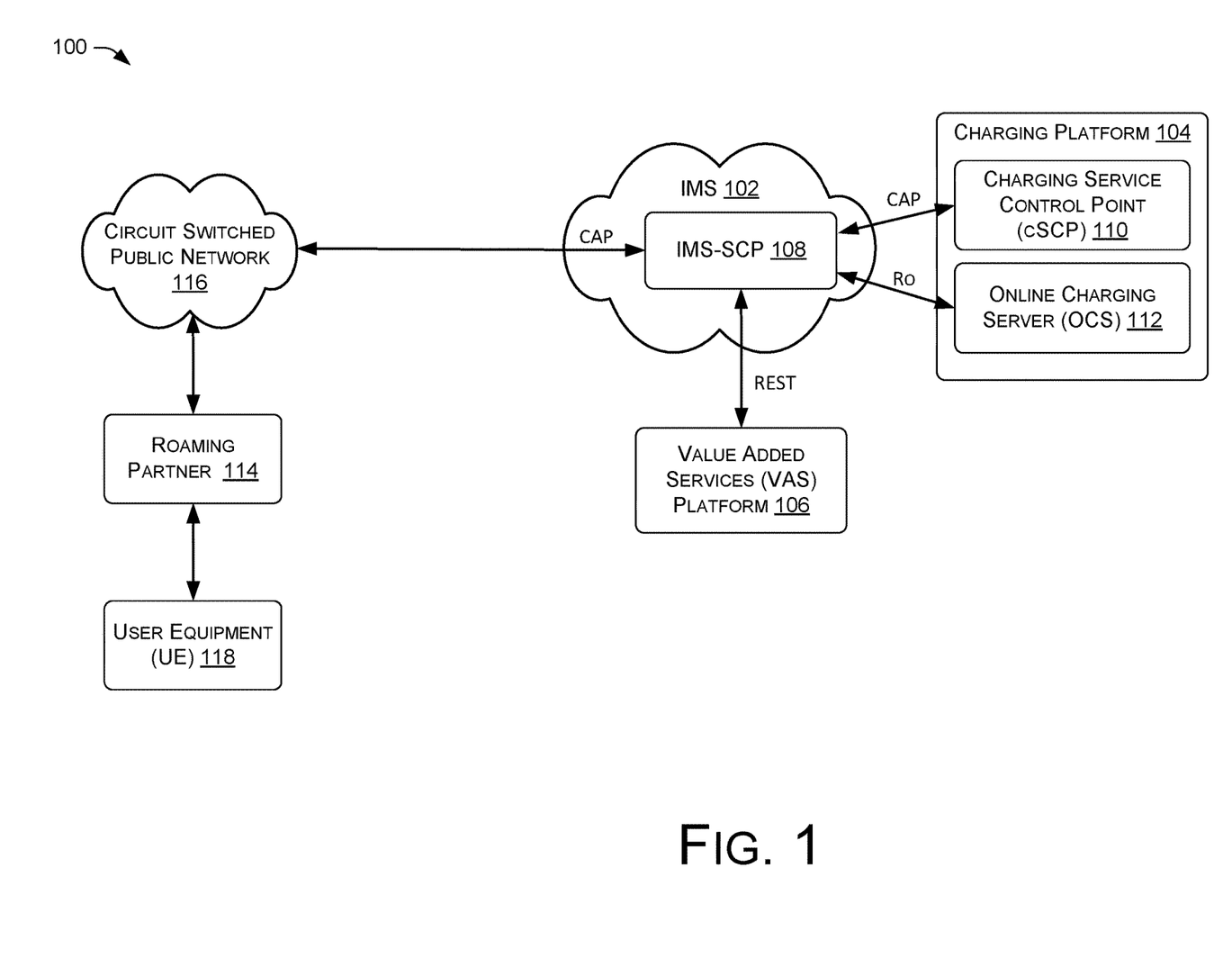
FIG. 1 is a block diagram illustrating a communication system that may provide trigger management between feature platforms for roaming calls in IMS networks.

FIG. 1 illustrates an example telecommunication system 100, which may provide trigger management between feature platforms for roaming calls in IMS networks. The system 100 includes a IMS 102 of a home carrier, a charging platform 104 and a VAS platform 106. The IMS 102 includes a IMS-SCP 108 and the charging platform includes a cSCP 110 and a OCS 112. The IMS 102 may communicate with a roaming partner 114 over a Circuit Switched Public Network 116 and/or other network devices which are not shown for ease of illustration and explanation. In some examples, the home carrier and roaming partner 114 may support communication between user equipment (UE) devices (referred to simply as UE in the following discussion). Communications may be between UEs of the same carrier (also referred to herein as service provider) and/or may be between UEs supported by different carriers. In this example, the illustrated UE 118 may be a subscriber of the home carrier associated with the IMS 102. Further, the illustrated UE 118 may be roaming in a service area of roaming partner 114 while attempting to obtain communication services.

The IMS 102 of the home carrier may provide communications services to user equipment supported by other carriers (e.g. roaming subscribers such as UE 118), referred to as partners or roaming partners, which may comprise other cellular providers or service providers. In some implementations, depending on the relationship between the carriers, the IMS 102 of the home carrier may communicate with the roaming partner 114 through various types of media, control functions and gateways. In the illustrated example, the communications between the IMS 102 and the roaming partner 114 may be over the Circuit Switched Public Network 116 and may utilize protocols such as CAMEL Application Part (CAP), Signaling System No. 7 (SS7), and Session Initiation Protocol (SIP).

The IMS 102 may support various types of communication and media services. In some examples, the IMS 102 may include a telephony access server that provides voice communication services. The IMS may also include or support other functions such as an IP short message gateway (IP-SM-GW), which is a service for communicating short messages, such as short message service (SMS) over IP (SMSIP) messages, between UEs. The IMS 102 also may include or support the Rich Communication Suite (RCS), which may be a platform that supports various types of media communications, including one-to-one chat, group chat, file transfer, content sharing, voice calling, video calling, social presence, video calling, geolocation exchange, service identification, notifications, and others. Each of these services may be implemented by one or more corresponding application servers that form part of the IMS 102.

The UE 118 may comprise a communication device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. The UE 118 may also comprise a non-mobile computing device. Examples of non-mobile UEs may include such things as televisions, desktop computers, a game consoles, set top boxes, home automation components, security system components, and so forth. In this sense, the terms "communication device," "wireless device," "wireline device," "mobile device," "computing device," and "user equipment (UE)" may be used interchangeably herein to describe any communication device capable of performing the techniques described herein.

Furthermore, the UE 118, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology. These are merely examples and the UE 118, as well as the various network provider components described herein, may be capable of communicating via one or more of a 3G, 4G, 4G LTE, and/or 5G protocols.

The UE 118 may communicate with the IMS 102 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

The UE 118 may be configured to initiate a communication session, such as a voice call, a video call, or another sort of synchronous or asynchronous communication. Initiation of such communications may involve communication clients and session initiation protocol (SIP) clients to communicate with components of the roaming partner 114.

More particularly, the UE 118 may be configured to initiate communication with a mobility management entity (MME) 112 of the roaming partner 114. The MME may interact with the UE 118 in an attachment process.

In the case of a subscriber in the service area of a roaming partner (e.g. UE 118) initiating a call, the roaming partner 114 may communicate with the IMS 102 of the home network, for handling of the call. More particularly, the roaming partner 114 may submit a call request, such as a CAMEL IDP message, to the IMS-SCP 108 over the circuit switched public network 116 utilizing a CAMEL Application Part (CAP) protocol interface. One of ordinary skill in the art would understand that the form and configuration of the circuit switched public network 116 may vary from implementation to implementation and the other interfaces and protocols may be utilized in accordance with this disclosure.

The inbound call request message may be received at the IMS 102. The IMS-SCP 108 may handle trigger management with respect to the various feature platforms involved in handling the requested call. In the illustrated example, the IMS-SCP 108 may provide trigger management for a charging platform 104 and a normalization platform (e.g. VAS 106). As illustrated, the IMS-SCP 108 may interact with the VAS platform 106 over a REST interface. Similarly, the IMS-SCP 108 may communicate with various charging platforms 104 over associated interfaces (e.g. over a CAMEL interface for a cSCP platform 110 or over a diameter (Ro) interface for an OCS platform 112). While illustrated as including both a cSCP platform 110 and a OCS platform 112, other examples may include one, both, or other charging platforms. Similarly, other examples may include additional or alternative normalization platforms. Moreover, other examples may include other types of feature platforms in addition or as alternatives to those illustrated in FIG. 1. For example, any type of value added service may be included such as a premium number detection service.

As discussed above, the IMS-SCP 108 may invoke feature platforms in a sequence and manage sessions therewith as each platform performs operations for an inbound call request. In some examples, the IMS-SCP 108 may maintain individual protocol and application level timers for each platform triggered. In addition, the IMS-SCP 108 may include an error detection framework for each platform triggered by the IMS-SCP 108 and the IMS-SCP 108 may be configured to control whether to continue or release the session for particular error cases.

In the illustrated example, the invocation and operation of the charging platform 104 and the VAS 106 may overlap and be at least partially in parallel. As such, the trigger management functionality of the IMS-SCP 108 may include functionality to perform updates between the charging platform 104 and the VAS 106 when operations of one platform change, update or otherwise cause a change to information upon which the other platform was invoked. For example, the normalization of the called number by the VAS platform 106 may modify or otherwise change the called number upon which the charging operations being performed by the charging platform 104 are based. Therefore, the IMS-SCP 108 may provide the normalized called number to the charging platform 104 over the appropriate interface and the ultimate rating for the call produced by the charging platform may be based on the normalized number.

As mentioned above, the IMS-SCP may handle updates between the feature platforms and the roaming partner 114. For example, if the called number gets normalized by the VAS platform, the IMS-SCP may communicate the updated number to the charging platform 104 (e.g. the cSCP 110 or OCS 112) for correct charging of the call. Further, if the number is changed by the normalization platform, the IMS-SCP may communicate the normalized number to the roaming partner 114 so that the roaming partner 114 may connect the call to the updated number.

In an example scenario for an inbound roaming call, a user of the UE 118 who is roaming internationally in the service area of the roaming partner 114 may dial an international number without using a country code. Such a call may normally result in an error for an invalid number. However, the normalization (e.g. VAS) platform 106 may provide functionality to detect a roaming location of the UE 118 and to add the correct country code to the called number to provide a routable phone number to the roaming partner 114 and charging platform 104. Further, if a number is one that requires real time charging, the IMS-SCP can perform trigger management between the charging platform 104 and the VAS 106 to give appropriate routing and charging of such calls.

In some examples, the sequence of the invocation between the platforms may be customizable and controlled by the operator of the IMS 102 (e.g. the operator may choose whether normalization or charging is invoked first) and the sequence may be situational. Further, other functions may be performed by the feature platforms and trigger management functionality. For example, the VAS may include a fraudulent number detection service that determines the called number is a known fraudulent number. In such a case, the IMS-SCP may instruct the charging platform to discontinue the charging functionality and instruct the vMSC to inform the UE that the call could not be completed due to fraud protection instead of merely allowing the charging system to continue processing (as the called number was not updated or normalized).

Further, in various cases such as the update of the charging of the call or in the case of a fraudulent or suspicious number detection, the IMS-SCP may facilitate the notification of the user by the charging platform or VAS of additional costs for the call to the dialed number or of the fraudulent or suspicious number detection and the subsequent handling of the call (e.g. notifying the user that the call was blocked).

Figure 2:
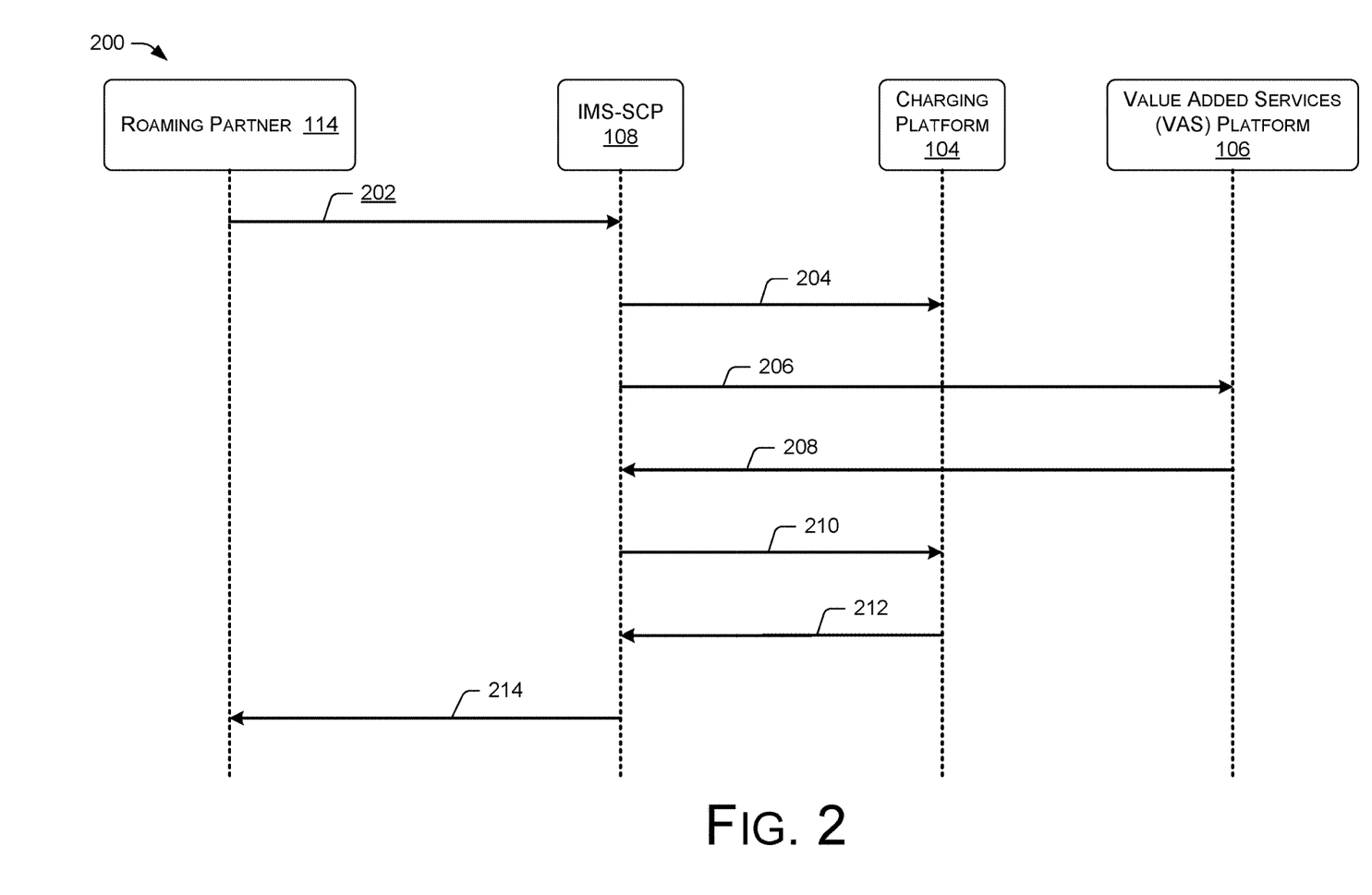
FIG. 2 is a flow diagram illustrating an example method of providing trigger management between feature platforms in the processing of roaming calls by an IP Multimedia Subsystem (IMS) in the example system of FIG. 1.

FIG. 2 illustrates an example method 200 of providing trigger management between feature platforms in the processing of roaming calls by an IP Multimedia Subsystem (IMS) in the example system of FIG. 1, according to some implementations. In the illustrated example, the data flow relates to the trigger management by the IMS-SCP 108 between the charging platform 104 and normalization platform (e.g. VAS 106) for an inbound call request from a roaming partner 114 related to a roaming subscriber UE 118. More particularly, the illustrated example of FIG. 2 includes the UE 118 initiating a call in the service area of the roaming partner 114.

At 202, the roaming partner 114 may forward a CAMEL IDP message related to the call initiated by the UE 118 to the IMS 102. The IMS 104 may receive the message and the IMS-SCP 108 may initiate trigger management for the received message. More particularly, at 204, the IMS-SCP 108 may invoke the charging platform 104 over a Ro or CAP interface for determination of the charging for the requested call based on a called number and identification of the UE 118. Subsequently, at 206, the IMS-SCP 108 may invoke the VAS 106 over a REST interface for normalization of the called number associated with the requested call.

At 208, the IMS-SCP 108 may receive a normalized called number from the VAS 106. The normalized called number may be received at the completion of operations by the VAS 106. Then, at 210, the IMS-SCP 108 may provide the normalized called number to the charging platform 104 for charging based on the normalized called number. At 212, after the determining of the charging for the requested call by the charging platform 104, the IMS-SCP 108 may receive charging information and/or a completion notice from the charging platform 104. Finally, at 214, the IMS-SCP 108 may provide the normalized called number to the roaming partner 114. The roaming partner 114 may then connect the call based on the normalized number.

While FIG. 2 illustrates the IMS-SCP sequentially triggering the charging platform 104 then the VAS 106 at 204 and 206, respectively, implementations are not limited to a particular sequence and the sequence may be situational. For example, on the reception of the IDP, the IMS-SCP may determine if a subscriber service profile is available and download the profile from a repository if necessary. Then, based on the subscriber service profile, the IMS-SCP may determine a service logic for orchestration (e.g. trigger management logic such as an invocation sequence) between the charging platform 104 and VAS 106. As mentioned above, the order of the orchestration logic may vary and some examples may include invoke the VAS 106 prior to the charging platform 104 (e.g. the order of messages 204 and 206 may be reversed).

Further, while 204 and 206 are illustrated to occur in an uninterrupted and undelayed sequence, this is merely for simplicity of illustration and explanation and implementation are not so limited. For example, the trigger management logic in some embodiments may include a delay prior to invoking the second feature platform. In such an example, one or more updates (e.g. updated first information such as a normalized called number) may be received from the first feature platform during the delay. In such an example, the IMS-SCP may utilize the updated first information in the initial invocation of the second feature platform. More particularly, in an embodiment in which the VAS is invoked first and provides a normalized called number to the IMS-SCP during a delay prior to the invocation of the charging platform, the IMS-SCP may utilize the normalized called number in the initial invocation fo the charging platform (e.g. instead of invoking the charging platform with the original number and then providing the normalized number to the charging platform in an update).

Figure 3:
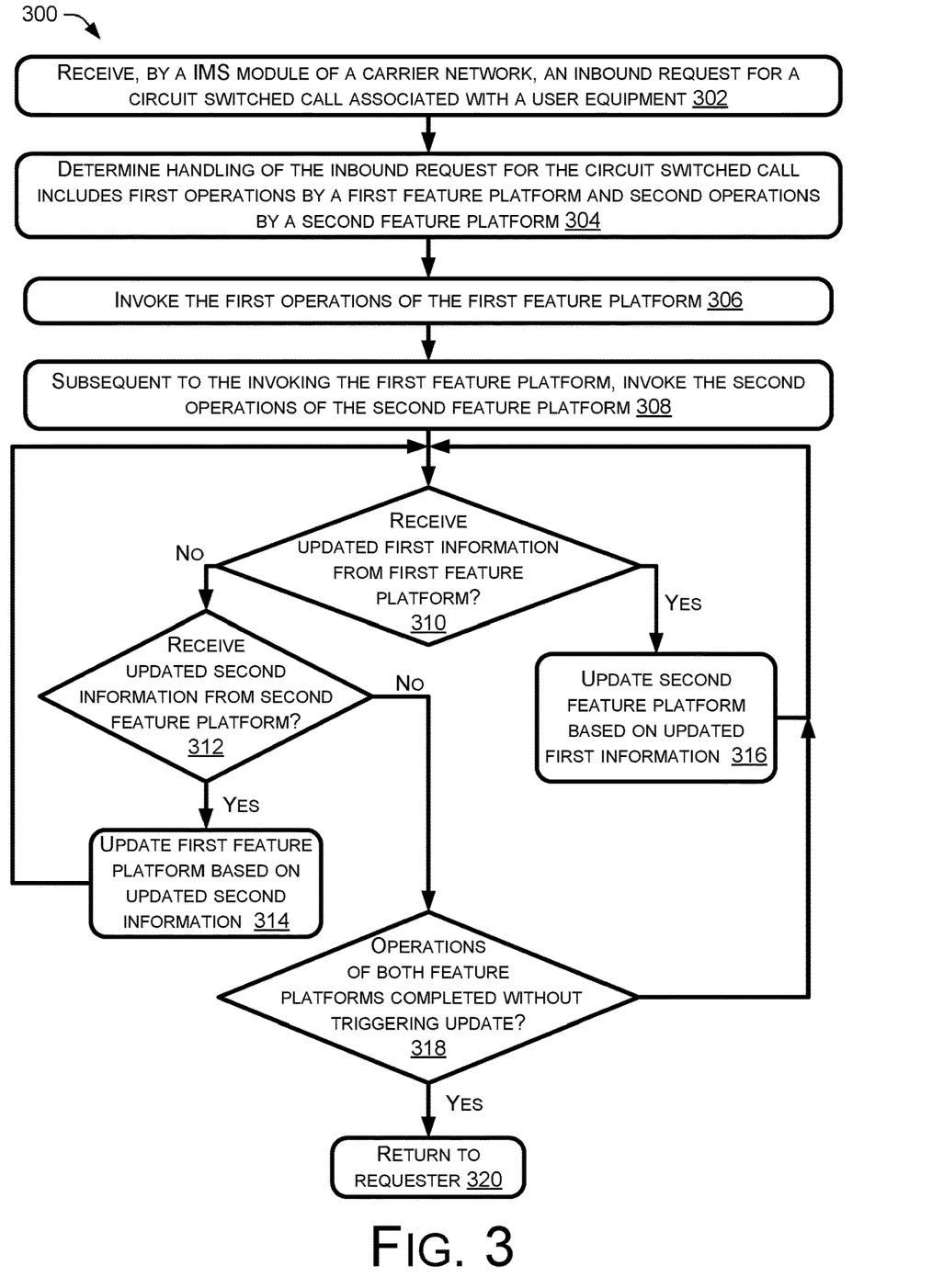
FIG. 3 is a flow diagram illustrating an example method of processing a roaming request in the example system of FIG. 1.

FIG. 3 illustrates an example method 300 of processing an inbound roaming request, according to some implementations.

At 302, the IMS module of a carrier network may receive an inbound request for a circuit switched call associated with a user equipment. At 304, an IMS-SCP of the IMS module may determine handling of the inbound request for the circuit switched call includes first operations by a first feature platform and second operations by a second feature platform (e.g. normalization and charging operations).

At 306, the IMS-SCP may invoke the first operations of the first feature platform. Then, subsequent to invoking the first operations of the first feature platform, at 308, the IMS-SCP may invoke the second operations of the second feature platform. In some cases, updated first information may be received from the first feature platform (e.g. a normalized called number) subsequent to the invoking of the first operations of the first feature platform but prior to the invocation of the second operations of the second feature platform. In such as case, the IMS-SCP may utilize the updated first information when invoking the second operations of the second feature platform.

At 310, subsequent the invocation of both the first operations of the first feature platform and the second operations of the second feature platform, the IMS-SCP may determine whether updated first information has been received from the first feature platform (e.g. a normalized called number). If so, at 316, the IMS-SCP may update the second feature platform based on the updated first information and the process returns to 310. Otherwise, the process continues to 312.

At 312, the IMS-SCP may determine whether updated second information has been received from the second feature platform. If so, at 314, the IMS-SCP may update the first feature platform based on the updated second information and the process returns to 310. Otherwise, the process continues to 318.

At 318, the IMS-SCP may determine whether operations of both the feature platforms has completed without triggering a further update of information. If not, the process returns to 310. If so, at 320, the IMS-SCP may return the updated information and/or information for connecting and handling the call may be returned to the requester (e.g. roaming partner 114).

Figure 4:
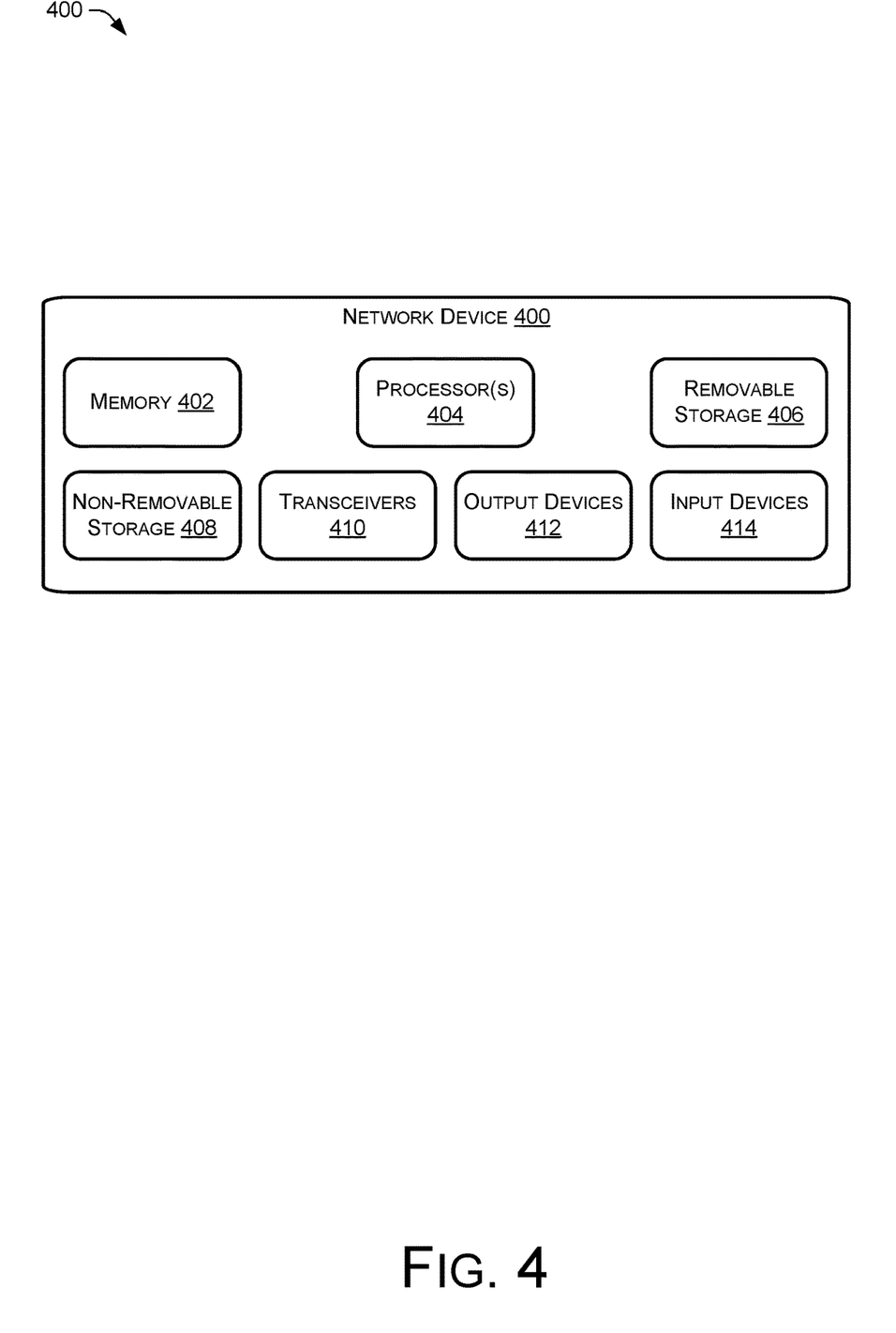
FIG. 4 is a block diagram illustrating relevant high-level components of a device that may be used to implement various of the components described herein.

FIG. 4 illustrates a component level view of a telecommunication network device 400 capable of implementing the IMS-SCP 108 and other network devices of FIG. 1. The network device 400 may, as an example, comprise a physical or virtual computer server. The network device 400 may comprise a system memory 402 storing various executable components and data for implementing the systems and methods 100-300 of FIGS. 1-3. The network device 400 may further comprise processor(s) 404, a removable storage 406, a non-removable storage 408, transceivers 410, output device(s) 412, and input device(s) 414, any or all of which can be communicatively connected via a communications bus (not shown).

In various examples, the system memory 402 is volatile (such as RAM), non-volatile (such as ROM, flash memory, etc.) or some combination of the two. In some examples, the processor(s) 404 is a central processing unit (CPU), a graphics processing unit (GPU), or both CPU and GPU, or any other sort of processing unit.

The network device 400 also includes additional data storage devices (removable and/or non-removable) such as, for example, magnetic disks, optical disks, or tape. Such additional storage is illustrated in FIG. 4 by removable storage 406 and non-removable storage 408. The system memory 402, removable storage 406 and non-removable storage 408 are all examples of non-transitory computer-readable storage media.

In some examples, the transceivers 410 include any sort of transceivers known in the art. For example, transceivers 410 may include a radio transceiver that performs the function of transmitting and receiving radio frequency communications. Also, or instead, the transceivers 410 may include other wireless or wired connectors, such as Ethernet connectors or near-field antennas. The transceivers 410 may facilitate connectivity between a public network, such as a packet-switched access network (not shown), and one or more other devices of a telecommunication network.

In some examples, the output devices 412 include any sort of output devices known in the art, such as a display, speakers, a vibrating mechanism, or a tactile feedback mechanism. Output devices 412 also include ports for one or more peripheral devices, such as headphones, peripheral speakers, or a peripheral display.

In various examples, the input devices 414 include any sort of input devices known in the art. For example, the input devices 414 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, by an IP Multimedia Subsystem Service Control Point (IMS-SCP) module of a carrier network, a request for a circuit-switched (CS) call associated with a user equipment;
   determining that handling of the request for the CS call includes one or more first operations by a first feature platform and one or more second operations by a second feature platform; and
   in response to the determining, performing, by the IMS-SCP module, trigger management associated with the request for the CS call at least by:
      invoking the first feature platform to perform the one or more first operations of the first feature platform; and
      subsequent to the invoking the first feature platform to perform the one or more first operations, invoking the second feature platform to perform the one or more second operations of the second feature platform.

2. The method of claim 1, wherein the one or more second operations include determining charging associated with the CS call.

3. The method of claim 1, wherein performing the trigger management associated with the request for the CS call further comprises:
   maintaining a first session for the first feature platform and a second session for the second feature platform until completion of the one or more first operations and the one or more second operations.

4. The method of claim 1, wherein the IMS-SCP module communicates with the first feature platform using a REST interface and with the second feature platform using at least one of a CAMEL interface or a Diameter Ro interface.

5. The method of claim 1, wherein:
   the one or more second operations include normalization of a called number of the CS call, and
   invoking the first feature platform to perform the one or more first operations includes providing the called number to the first feature platform, wherein performing the trigger management further comprises:
      receiving a normalized number from the second feature platform; and
      providing the normalized number to the first feature platform for use in the one or more first operations.

6. The method of claim 5,
   wherein the carrier network is a home carrier network of the user equipment and the request for the CS call is received from a roaming carrier network with which the user equipment is communicating, and
   wherein performing the trigger management associated with the request for the CS call further comprises:
      receiving first feature information from the first feature platform based on the normalized number; and
      providing the normalized number to the roaming carrier network.

7. The method of claim 5, wherein the determining further includes determining a sequence order for invoking of the one or more first operations and the one or more second operations.

8. The method of claim 1, wherein the IMS-SCP module is separate from a telephony application server (TAS) module of the carrier network.

9. A system comprising:
   one or more computing devices of a first carrier configured to perform actions comprising:
   receiving, by an IP Multimedia Subsystem Service Control Point (IMS-SCP) module of a carrier network, a request for a circuit-switched (CS) call associated with a user equipment;
   determining that handling of the request for the CS call includes one or more first operations by a first feature platform and one or more second operations by a second feature platform; and
   in response to the determining, performing, by the IMS-SCP module, trigger management associated with the request for the CS call at least by:
      invoking the first feature platform to perform the one or more first operations of the first feature platform; and
      subsequent to the invoking the first feature platform to perform the one or more first operations, invoking the second feature platform to perform the one or more second operations of the second feature platform.

10. The system of claim 9, wherein the one or more first operations include operations which alter call information of the CS call in response to a determination by the first feature platform.

11. The system of claim 10, wherein performing the trigger management associated with the request for the CS call further comprises:
    maintaining a first session for the first feature platform and a second session for the second feature platform until completion of the one or more first operations and the one or more second operations.

12. The system of claim 9, wherein:
    the one or more second operations include alteration of call information of the CS call in response to a determination by the second feature platform, and
    invoking the first feature platform to perform the one or more first operations includes providing the call information to the first feature platform for use in the one or more first operations, wherein performing the trigger management further comprises:
    receiving altered call information from the second feature platform; and
    providing the altered call information to the first feature platform for use in the one or more first operations.

13. The system of claim 12,
    wherein the carrier network is a home carrier network of the user equipment and the request for the CS call is received from a roaming carrier network with which the user equipment is communicating, and wherein performing the trigger management associated with the request for the CS call further comprises:

receiving first feature information from the first feature platform based on the altered call information; and providing the altered call information to the roaming carrier network.

14. The system of claim 12, wherein the determining further includes determining a sequence order for invoking of the one or more first operations and the one or more second operations.

15. A non-transitory computer-readable media storing computer-executable instructions, which when executed by one or more processors, cause the one or more processors to perform actions comprising:

receiving, by an IP Multimedia Subsystem Service Control Point (IMS-SCP) module of a carrier network, a request for a circuit-switched (CS) call associated with a user equipment;

determining that handling of the request for the CS call includes one or more first operations by a first feature platform and one or more second operations by a second feature platform; and in response to the determining, performing, by the IMS-SCP module, trigger management associated with the request for the CS call at least by:

invoking the first feature platform to perform the one or more first operations of the first feature platform; and subsequent to the invoking the first feature platform to perform the one or more first operations, invoking the second feature platform to perform the one or more second operations of the second feature platform.

16. The non-transitory computer-readable media of claim 15, wherein the one or more second operations include determining charging associated with the CS call.

17. The non-transitory computer-readable media of claim 16, wherein performing the trigger management associated with the request for the CS call further comprises:

maintaining a first session for the first feature platform and a second session for the second feature platform until completion of the one or more first operations and the one or more second operations.

18. The non-transitory computer-readable media of claim 15, wherein:

the one or more second operations include normalization of a called number of the CS call, and invoking the first feature platform to perform the one or more first operations includes providing the called number to the first feature platform, wherein performing the trigger management further comprises:

receiving a normalized number from the second feature platform; and providing the normalized number to the first feature platform for use in the one or more first operations.

19. The non-transitory computer-readable media of claim 18, wherein the carrier network is a home carrier network of the user equipment and the request for the CS call is received from a roaming carrier network with which the user equipment is communicating, and wherein performing the trigger management associated with the request for the CS call further comprises:

receiving first feature information from the first feature platform based on the normalized number; and providing the normalized number to the roaming carrier network.

20. The non-transitory computer-readable media of claim 15, wherein the determining further includes determining a sequence order for invoking of the one or more first operations and the one or more second operations.

* * * * *